May 5, 1959   J. TER BERG ET AL   2,885,533
ELECTRIC ARC WELDING APPARATUS
Filed Jan. 3, 1957

INVENTOR
JOZEF TER BERG
ANDRE L ARIGALDIE
BY
Frank R. Liparii
AGENT

United States Patent Office 2,885,533
Patented May 5, 1959

2,885,533
ELECTRIC ARC WELDING APPARATUS

Jozef ter Berg and André Larigaldie, Bobigny, France, assignors, by mesne assignments, to North American Philips Company, Inc., New York, N.Y., a corporation of Delaware Application January 3, 1957, Serial No. 632,364

Claims priority, application France January 6, 1956

3 Claims. (Cl. 219—125)

The invention relates to an electric arc welding apparatus of the type using a disc-shaped electrode which is adapted to be melted down during the welding, and which is rotatably mounted and movable over the work piece to be welded.

During the welding operation an arc is maintained between the edge of the disc-shaped electrode and the work piece, while the rotating electrode is displaced relatively to the work piece over a seam to be filled with welding metal. It has been suggested to provide the disc-shaped electrode with a coating, the thickness of which is such that the arc forms a groove along the periphery of the electrode, which coating bears upon the edges of the groove while the welding apparatus is moved over the seam, so that the disc rotates.

In accordance with the invention the length of the welding arc is adjusted in a different manner and the disc-shaped electrode is rotated otherwise, i.e. by supporting the periphery of the disc from a roller or a wheel which is of electrically non-conductive material and which bears on the work piece.

When the welding apparatus is moved during the welding, the disc-shaped electrode is rotated by means of the roller or the wheel on which it bears, and in spite of the wear of the disc which gradually reduces the diameter thereof, the length of the welding arc is kept substantially constant during the welding operation.

With the apparatus according to the invention use is preferably made of uncoated electrodes; in which case the molten welding metal is protected from the air by means of a gas, for instance, argon, helium or carbon dioxide, which is blown into the arc through pipes.

In certain cases it may be advantageous to cover the edge of the disc-shaped electrode with a thin coating.

A few embodiments of the invention will be described with reference to the accompanying drawing.

Figure 1:
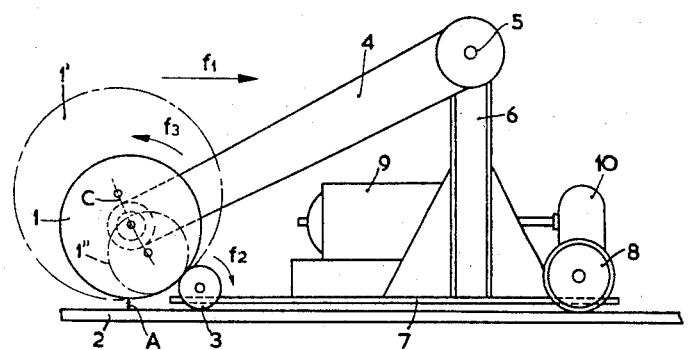
Fig. 1 is a side view of a welding apparatus according to the invention, in which use is made of a thinly coated disc.

Referring now to the figures, reference numeral 1 designates a disc-shaped electrode provided with a thin coating which supplies the slag for the protection of the molten-welding metal. Prior to being used, the disc 1 had a considerably larger diameter as indicated by 1', and after the welding proceeds further, the electrode diameter will be further decreased, as indicated by 1". Electrode 1, regardless of changes in diameter, engages a roller or wheel 3 of electrically non-conductive material which is rotatably mounted on a carriage 7 and engages a workpiece 2.

The disc-shaped welding electrode 1 is rotatably mounted on a shaft secured to one end of an arm 4 whose other end is pivoted at 5 on a support 6. Support 6 is mounted on a plate 7 provided with five wheels 3—8 (only 2 shown) so that it may roll over the work piece 2. This movement is effected by an electric motor 9 which drives the wheel 8 through a suitable transmission 10.

When the welding apparatus is moved in the direction of the arrow $f_1$, the wheel 3 rotates in the direction of the arrow $f_2$, so that the disc-shaped electrode 1 rotates in the direction of the arrow $f_3$.

Figure 2:
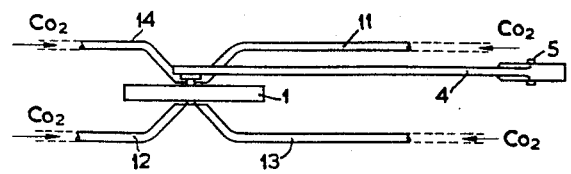
Fig. 2 is a plan view of a disc-shaped electrode used for welding in a carbon dioxide atmosphere, which is supplied to the welding area through a set of pipes.

In Fig. 2 reference numeral 1 designates the disc-shaped electrode, 4 denotes the arm on which it is seated rotatably and which is rotatable itself about the point 5. The pipes 11, 12, 13 and 14 introduce carbon dioxide gas into the arc. By adjusting the blowing force of these pipes, the arc can be caused to strike at the desired area over the work piece at the edge of the electrode, this area being furthermore determined by the speed of rotation of the disc-shaped electrode 1. Usually only the pipes 11 and 13 will be used to supply the carbon dioxide gas. As an alternative the blowing force of the pipes 11 and 13 may exceed that of the pipes 12 and 14, at least when the welding apparatus is displaced in the direction of the arrow $f_1$ of Fig. 1. The blowing force of the pipes 11 to 14 improves the stability of the welding arc so that other means of stabilisation, for example a magnetic field, may be omitted.

Instead of using the arm 4, use may be made of other means to hold the electrode in the correct position over the welding area, i.e. by providing a displaceability of the electrode shaft along a simple path of a shape such that the shortest distance between the electrode edge and the work piece remains constant with different diameters of the disc-shaped electrode.

What is claimed is:

1. An electric arc-welding apparatus comprising a carriage adapted to be moved over a workpiece, a disc-shaped electrode supported by said carriage and adapted to be positioned with its periphery spaced from the workpiece to form an arc space, and means to maintain the length of the arc space substantially constant during reduction in diameter of the electrode during the welding, said means including a member mounted on said carriage and supporting said electrode for movement over a pre-determined path, and a member contacting the periphery of said electrode and being mounted upon said carriage.

2. An electric arc-welding apparatus comprising a carriage adapted to be moved over a workpiece, a pivot on said carriage, a supporting member having one end rotatably mounted on said pivot, a disc-shaped electrode rotatably mounted on the other end of said member, and a roller rotatably mounted on said carriage and engaging said electrode at a point nearer said pivot than is the axis of the electrode, and means including said carriage for maintaining the axis of said roller at a substantially constant distance from the workpiece during operation of the apparatus.

3. An electric arc-welding apparatus comprising a carriage adapted to be moved over a workpiece, a pivot on said carriage, a supporting arm having one end rotatably mounted on said pivot, a disc-shaped electrode rotatably mounted on the other end of said arm, and a roller rotatably mounted on said carriage and engaging said electrode at a point nearer said pivot than is the axis of the electrode, said roller being of electrically non-conductive material and being arranged to contact the workpiece.

References Cited in the file of this patent
UNITED STATES PATENTS

| | | |
|---|---|---|
| 847,746 | Edison | Mar. 19, 1907 |
| 1,217,431 | Foley | Feb. 27, 1917 |
| 2,015,415 | Steiner | Feb. 24, 1935 |
| 2,330,503 | Longoria | Sept. 28, 1943 |
| 2,415,052 | Waddington | Jan. 28, 1947 |